(12) United States Patent　　(10) Patent No.: US 8,448,606 B2
Yackley　　(45) Date of Patent: May 28, 2013

(54) METHOD AND APPARATUS FOR PET TETHERING DEVICE

(75) Inventor: Bob Yackley, Plainfield, IL (US)

(73) Assignee: IntelliLeash Products, Inc., Plainfield, IL (US)

( * ) Notice: Subject to any disclaimer, the term of this patent is extended or adjusted under 35 U.S.C. 154(b) by 159 days.

(21) Appl. No.: 12/948,474

(22) Filed: Nov. 17, 2010

(65) Prior Publication Data

US 2011/0120389 A1　　May 26, 2011

Related U.S. Application Data

(60) Provisional application No. 61/262,028, filed on Nov. 17, 2009.

(51) Int. Cl.
*A01K 15/02* (2006.01)
*A01K 27/00* (2006.01)

(52) U.S. Cl.
USPC ............ 119/721; 119/786; 119/789; 119/796

(58) Field of Classification Search
USPC ................. 119/795, 796, 769, 784, 786, 787, 119/788, 789, 792, 794, 720, 721
IPC .................................. A01K 15/00,15/02, 27/00
See application file for complete search history.

(56) References Cited

U.S. PATENT DOCUMENTS

| | | | |
|---|---|---|---|
| 6,142,102 A * | 11/2000 | Mack et al. .................... | 119/720 |
| 6,158,389 A * | 12/2000 | Wehrell ......................... | 119/704 |
| 2007/0107669 A1* | 5/2007 | Eaton et al. .................... | 119/792 |
| 2007/0215064 A1 | 9/2007 | Petersen | |
| 2008/0072845 A1 | 3/2008 | Head | |
| 2008/0173257 A1* | 7/2008 | Steiner et al. ................. | 119/796 |
| 2008/0314336 A1* | 12/2008 | Church et al. ................ | 119/771 |
| 2010/0018473 A1* | 1/2010 | Brown .......................... | 119/784 |
| 2010/0139568 A1* | 6/2010 | Rousseau .................... | 119/14.04 |
| 2011/0041778 A1* | 2/2011 | Le Croix ....................... | 119/796 |
| 2011/0073047 A1* | 3/2011 | Simpson et al. .............. | 119/796 |

FOREIGN PATENT DOCUMENTS

JP　　2004065219 A　*　3/2004
JP　　2004222717 A　*　8/2004

* cited by examiner

*Primary Examiner* — Son T Nguyen
*Assistant Examiner* — Shadi Baniani
(74) *Attorney, Agent, or Firm* — Erickson Law Group, PC

(57) ABSTRACT

A tether device allows a pet to roam freely within a pre-defined area of space while restricting the pet from moving beyond the perimeter of a pre-defined area. The location of the perimeter is programmed into the tether device by providing distance and angular coordinates of the distal end of the tether from the tether device. The location of the pet, once attached to the tether device is likewise determined by the combination of coordinates. When the microcontroller senses the pet is nearing the perimeter of the pre-defined area, a lock mechanism is activated which prevents further movement in a direction that will exceed the perimeter, and only allows movement of the pet away from the perimeter. The lock mechanism may have a cushioning mechanism to prevent a hard stop. The tether device can also generate alarm tones to alert the user and/or train the pet.

7 Claims, 14 Drawing Sheets

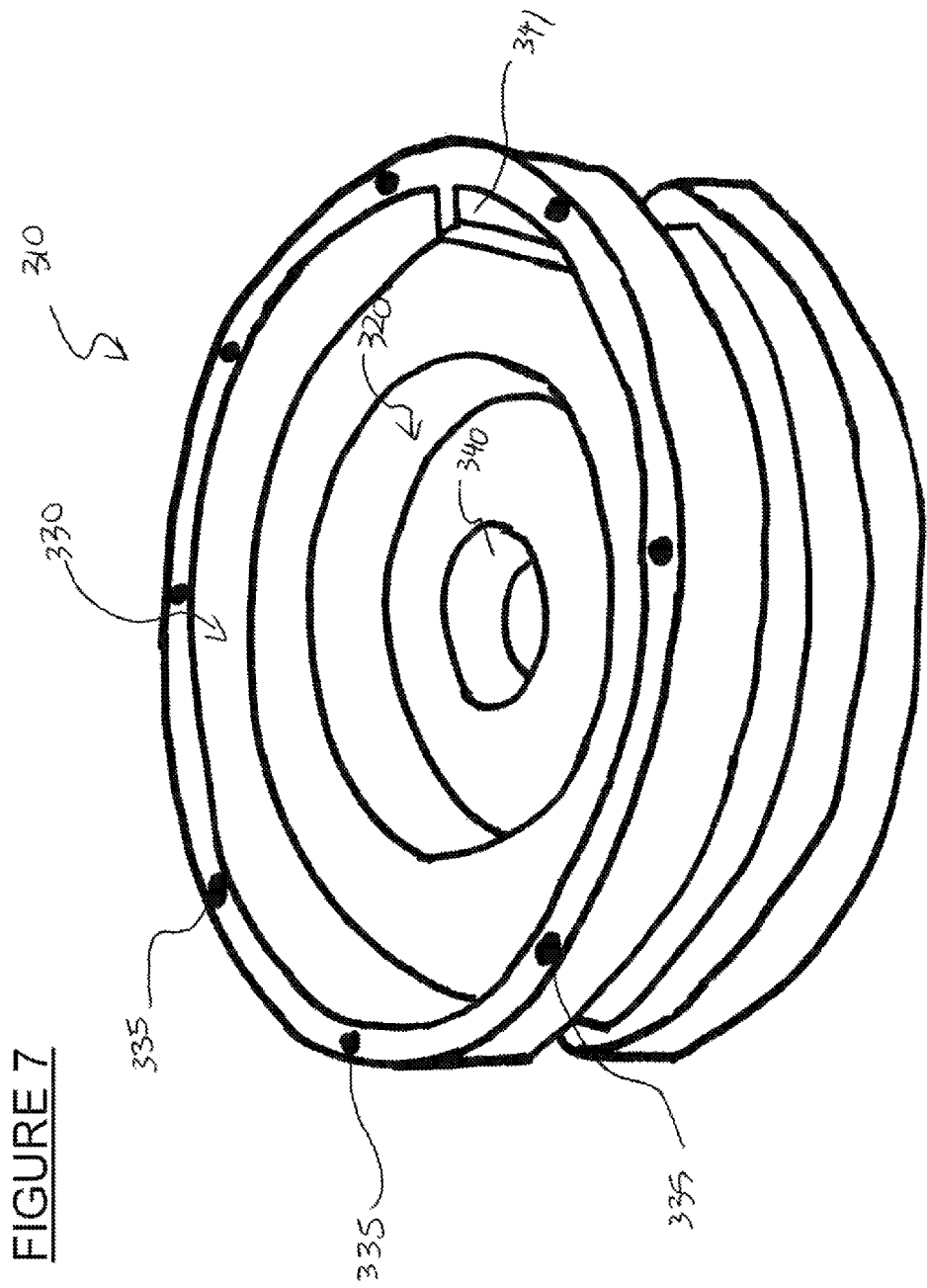

METHOD AND APPARATUS FOR PET TETHERING DEVICE

This application claims the benefit of U.S. Provisional application No. 61/262,028, filed Nov. 17, 2009.

FIELD OF THE INVENTION

This invention relates in general to pet tethers, in particular retractable pet tethers suitable for use outdoors.

BACKGROUND OF THE INVENTION

When pets are left outdoors, it is often desirable for pets to be tethered. Pets are tethered for a variety of reasons, such as preventing the pet from leaving a yard area, or preventing the pet from going into certain areas of a yard, such as into flower beds or bodies of water. Pets are often kept outdoors and tethered to a stationary object, such as a stake which is secured to the ground.

Various pet tethers that have been developed include a pet leash that is attached to a stake in the ground. A long tether allows the dog to move over a wider range of area, yet at the same time, results in a higher likelihood of entanglement. Retractable tethers, which dispense and retract as the pet moves farther or closer away from the retractable tether, have been developed to reduce the likelihood of a tether becoming entangled.

U.S. Patent Application Publication No. 2007/0215064 discloses a retractable pet tether attached to a shaft. U.S. Patent Application Publication No. 2008/0072845 discloses a rotatable and retractable pet tether attached to a spiral stake.

While retractable tethers reduce the likelihood of entangling the tether by reducing the amount of slack on the tether, prior art retractable tethers do not adjust the dispensing of the tether based on which areas within a region of space, for example a yard, the pet is allowed to roam.

The present inventor has recognized a need for a retractable pet tether that can restrict additional feeding of the tether based on the position of the pet. The smart pet tether can maximize the area the pet is allowed to roam, while restricting pets from off limits areas by using a passive retreat mechanism.

The present inventor has recognized the need for a retractable pet tether also capable of training a pet to know the limits of the free range area.

SUMMARY OF THE INVENTION

In one embodiment, the present disclosure provides a pet tethering device comprising a support for a tether spool and a microcontroller. The support comprises a yoke extending into a stator plate. A spool support shaft extends from the stator plate portion of the yoke to support the tether spool. A yoke shaft with a directional sensor incorporated therein is used to provide the rotational position of the yoke assembly, relative to a pre-designated reference position, to a microcontroller.

The tether spool is disposed on the tether spool shaft wherein the tether spool is allowed to revolve around the spool shaft to pay out or retract the tether in accordance with the perimeter of the pet's free roam area which is programmed into the tether device. Magnets on the rim of the spool, in conjunction with a payout sensor, keep track of the payout and retraction of the tether.

The combination of the payout sensor and the directional sensor provides distance and angular coordinates respectively, which identify the position of the pet, and serves as the basis for tracking the movement of the pet to limit free movement to only within the permissible boundaries.

When the amount of tether dispensed corresponds to the pet approaching a pre-determined off-limits area, a primary stop mechanism is activated to restrict continuous rotations in the dispensing direction, but allow for retraction, thus encouraging the pet to retreat from the off-limit areas.

The tether spool comprises a stop mechanism side which faces the stator plate, and a retraction spring side on the opposite end of the spool. The retraction spring side is preferably recessed to receive a retraction spring which provides an inclination to reel the tether back onto the spool. The retraction spring is positioned at the distal end of the tether spool shaft. The stop mechanism side is recessed to receive a spool insert connected to the stop mechanism side of the spool via a torsion spring. The spool insert is a disk shaped insert with a ratcheted surface within the plane of the disk which faces the stator plate, and a coil engagement side on the opposite surface which engages with the torsion spring connected to the recessed surface of the stop mechanism side. The resistance of the torsion spring provides for a cushioning stop. The tether spool further comprises a positive stop mechanism to provide an absolute stop for the pet. The tether spool also comprises a mechanical engagement for connecting one end of the tether to the spool to allow for replacement of the tether.

The microcontroller allows for programming of the device. A user interface allows the user to select a "program mode." In program mode, the user indicates a home position by grasping the distal end of the tether and walking to the home position, typically the position normally used to attach and detach the pet to the device. Once a home position has been set, the user walks around a path corresponding to the maximum area the pet is allowed to roam while holding the distal end of the tether, thus sweeping out an area defined by tether length and tether angle within which the pet is allowed to roam freely.

The tether device is power operated. Power for the tether device can be provided by a battery, a rechargeable battery, a solar panel, or other suitable mechanisms for providing a power source, or a combination thereof.

In one embodiment, an alarm device is further incorporated with the tether device. The alarm system can either provide notification to the user for predetermined events, and/or can also provide a sound for pet training purposes.

Numerous other advantages and features of the present invention will become readily apparent from the following detailed description of the invention and the embodiments thereof, from the claims and from the accompanying drawings.

BRIEF DESCRIPTION OF THE DRAWINGS

FIG. 7 is a perspective view of the stop mechanism side of one embodiment of the tether spool.

DETAILED DESCRIPTION OF THE PREFERRED EMBODIMENTS

Figure 1:
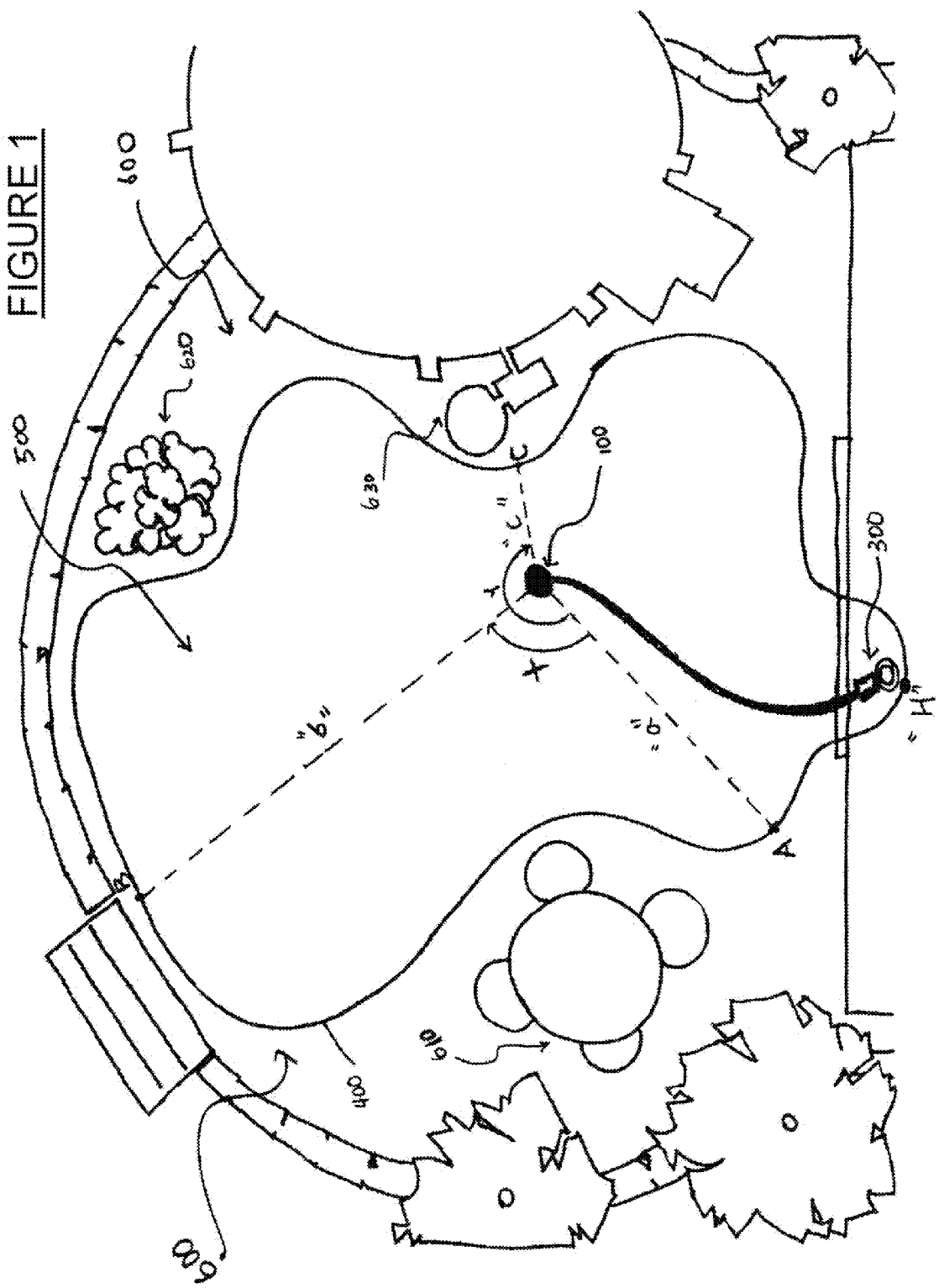
FIG. 1 is a top view of a yard using the pet tether device.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

FIG. 1 illustrates the tether device 100 in a yard within a permissible pet area 500 defined by an outer perimeter 400, beyond which is an off limits area 600. The distal end of the tether 300 is capable of reaching a home position "H" where the pet is typically attached and detached from the tether device. Typically the home position is a location where it is convenient for the user to detach and attach the pet to the tether, such as just outside a patio door. The user programs the home position "H" into the tether device by activating the program mode, grasping the distal end 300 of the tether and walking to the home position. The home position is identified by the combination of an angular position and the length of payout of the tether to reach the home position from where the tether device is situated.

Figure 4:
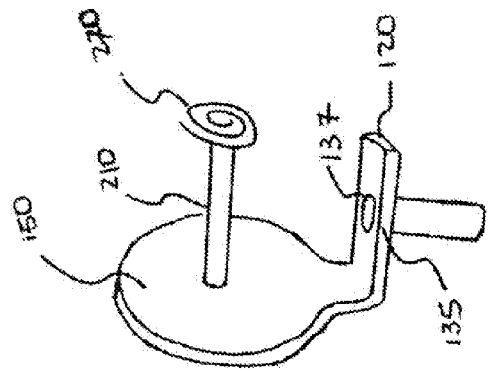
FIG. 4 is a perspective view of one embodiment of the tether support.
Figure 2:
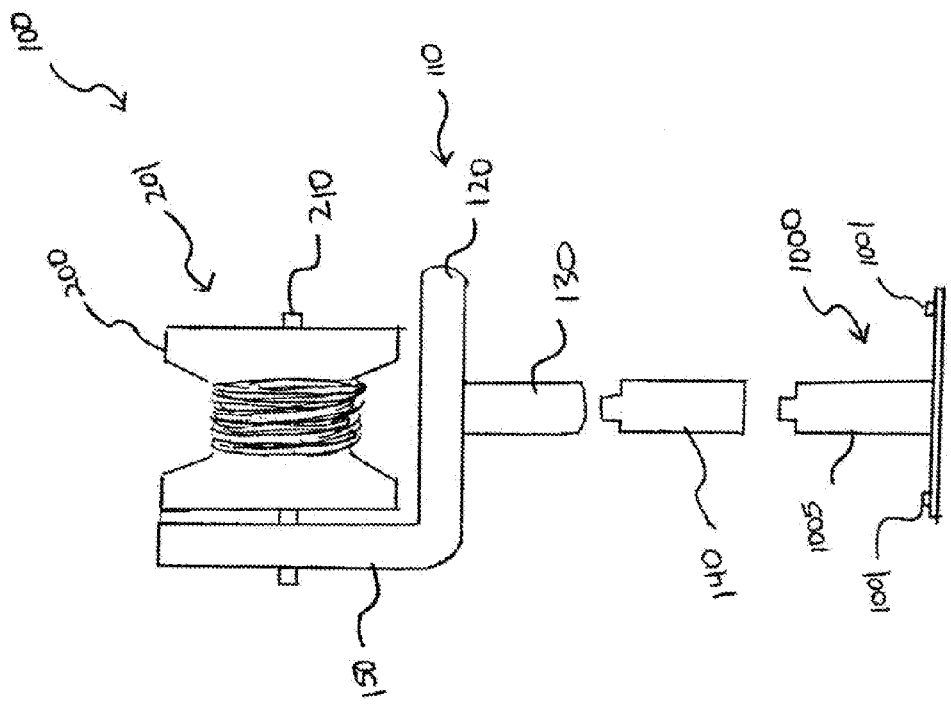
FIG. 2 is a side view of the tether device with external housing removed for clarity.

The tether device 100, in the embodiment illustrated in FIG. 2, comprises tether support 110, the tether spool 200, and a tether spool support shaft 210. The tether support 110 comprises a horizontal yoke 120 with an upward extension which extends to become a stator plate 150. Extending from the stator plate 150 is the tether spool support shaft 210. A yoke shaft 130 extends from the yoke 120 via a yoke bearing 135 (FIG. 4). As the yoke 120 rotates about the yoke shaft 130, a rotational direction sensor 137 (FIG. 4) disposed within the yoke bearing 135 senses the position of the distal end of the tether, based on the angular position of the yoke 120. The yoke 120 and the entire spool assembly 201 mounted in connection to the yoke is able to rotate about the yoke shaft. The yoke is able to rotate in excess of 360 degrees in either direction around the yoke shaft. In one embodiment, the rotational sensor can be a directional encoder or a rotational potentiometer. Information about the rotational position of the tether is provided to the microcontroller to assist in determining the position of the pet.

In an alternate embodiment the tether spool support shaft can be oriented such that the axis of the tether spool support shaft is parallel to the axis of rotation of the yoke shaft, or parallel to the axis about which the distal end of the tether rotates.

Figure 3:
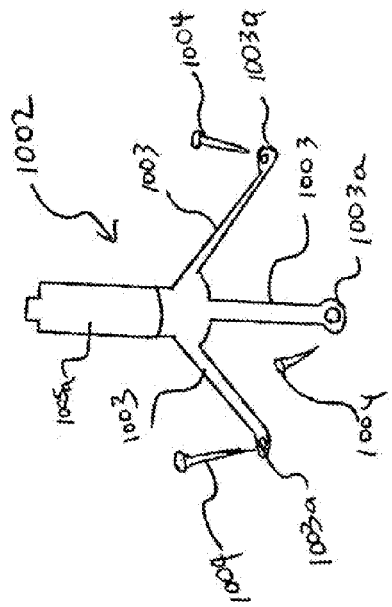
FIG. 3 is a perspective view of an alternate embodiment of a base for the tether device.

Depending on the where the tethering device is being used, a suitable base for the tether is selected. As illustrated in FIG. 1, the tether device is used in the middle of a back yard. Alternatively, the tether device can be placed at the home position. The tether device can also be used indoors. FIG. 2 illustrates one embodiment of a permanent base 1000 which can be permanently secured to a flat surface such as a concrete surface or a wooden deck. The base 1000 can be affixed to the surface via bolts 1001. FIG. 3 illustrates an alternate embodiment of a base 1002, which is portable. The portable base 1002 comprises three supporting leg structures 1003 with each with an eyelet 1003a at the end of each leg wherein stakes 1004 can be driven through to secure the base to the surface of the ground. The portable base can be suitable for use with an uneven ground surface.

Both the permanent base 1000 and portable base 1002 embodiments comprise base shafts 1005, 1005a respectively which can be coupled with a shaft extension 140 as illustrated in FIG. 2, or can be coupled directly with the yoke shaft 130. A user may opt to use a shaft extension 140 to elevate the tether device when needed, for example such as in the event of snow, such that the tether device clears the surface of snow, or to avoid obstacles to prevent impeding the operation of the tether device. More than one shaft extension can be used to achieve the desired elevation of the tether device. The yoke shaft, shaft extensions, and the base shaft are coupled to each other by mechanical coupling known to one skilled in the art, such as by a fitted coupling or by a threaded coupling.

FIG. 4 illustrates a perspective view of the yoke 120 which extends upwards into the stator plate 150. Extending horizontally from the stator plate 150 is a spool support shaft 210, on which the tether spool 200 is supported and allowed to rotate to dispense tether. On the distal end of the spool support shaft 210 is a retraction spring 270. In one embodiment, the retraction spring is a power spring. Other suitable spring mechanism to effectuate a retraction can also be used. One end of the retraction spring is connected to the tether spool support shaft 210. The retraction spring is disposed around the spool support shaft 210 and connected to the retraction spring side of the tether spool 200 to provide the natural inclination for the tether spool to reel in tether when pet is moving towards the tether device. The yoke, stator plate, and tether spool support shaft may be an unitary piece, or alternatively only the yoke and stator plate may be an unitary piece.

Figure 5:
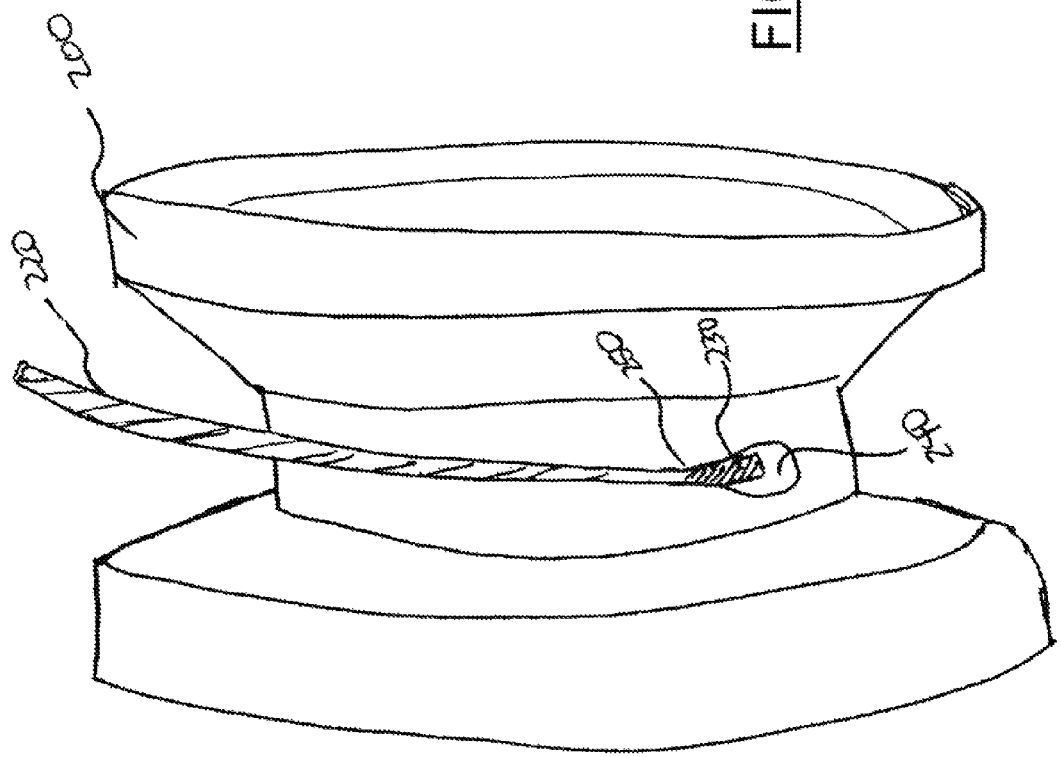
FIG. 5 is a perspective view of one embodiment of the tether spool.

FIG. 5 illustrates the tether spool 200 with the tether 220 unwound to reveal the end of the tether 230 connected to the tether spool. The connection end of the tether 230 is connected to the spool by a mechanical engagement. In the embodiment shown in FIG. 5, the mechanical engagement comprises a groove 240 which catches the end of the tether 230 which is wider than a narrowing portion 250 of the groove. Other mechanical engagements for effectuating the attachment of the tether to the spool can be used such as using a releasable linkage. Any other suitable engagement mechanism can be used to allow for the replacement of the tether in the event the tether needs to be replaced due to regular wear and tear, or when the tether breaks as a result of the pet being too aggressive. Alternatively, the tether may be connected to the spool permanently.

Figure 6:
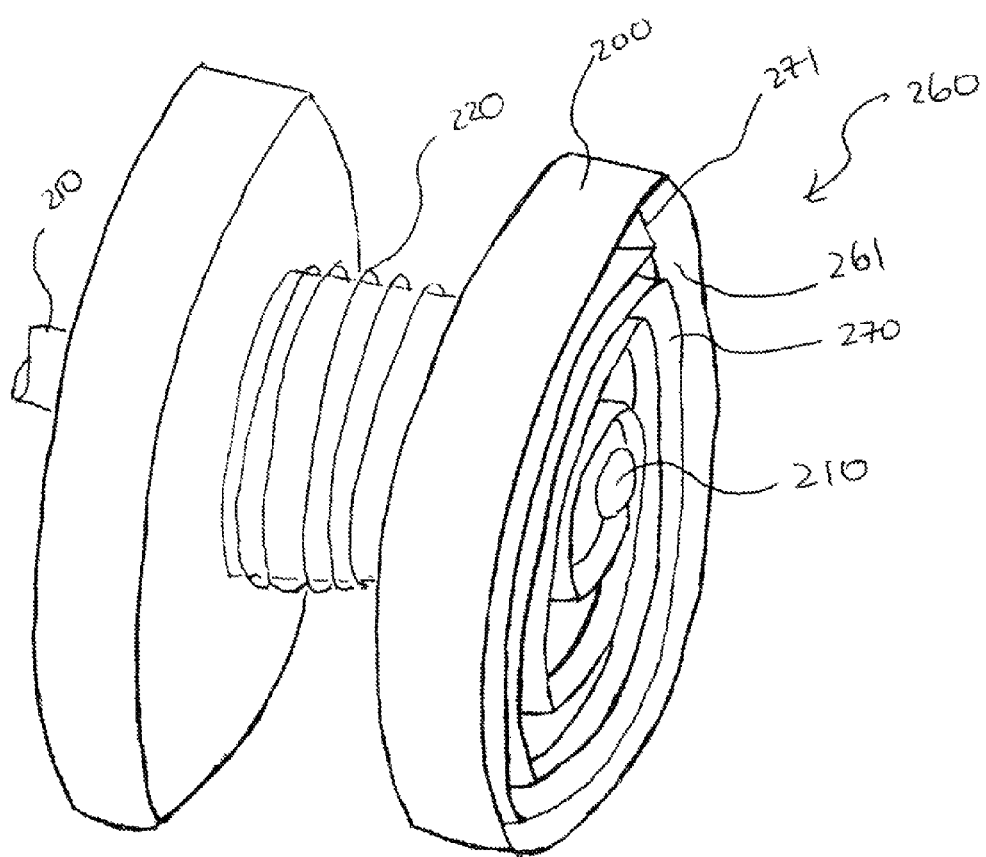
FIG. 6 is a perspective view of the retraction spring side of one embodiment of the tether spool.

FIG. 6 illustrates the retraction spring side 260 of the tether spool 200. In one embodiment, the retraction spring side 260 of the tether spool 200 is recessed such that at least a portion of the width of the retraction spring 270 can be nested within the retraction spring side of the tether spool. The end of the retraction spring not connected to the spool support shaft 210 is connected to the retraction spring side of the tether spool. The connection can be by way of a tang 271 in mechanical engagement with the recessed rim 261 of the retraction spring side of the tether spool. The opposite end of the retraction spring not attached to the tether spool can be connected to the spool support shaft 210 by a similarly suitable mechanism. The retraction spring effectuates a constant recoiling force which causes the tether to retract to avoid slack in the tether when the pet moves towards the tethering device. In an alternate embodiment, the retraction spring can be disposed within a spool passageway 340 (FIG. 7), through which the tether spool support shaft 210 passes.

Figure 8:
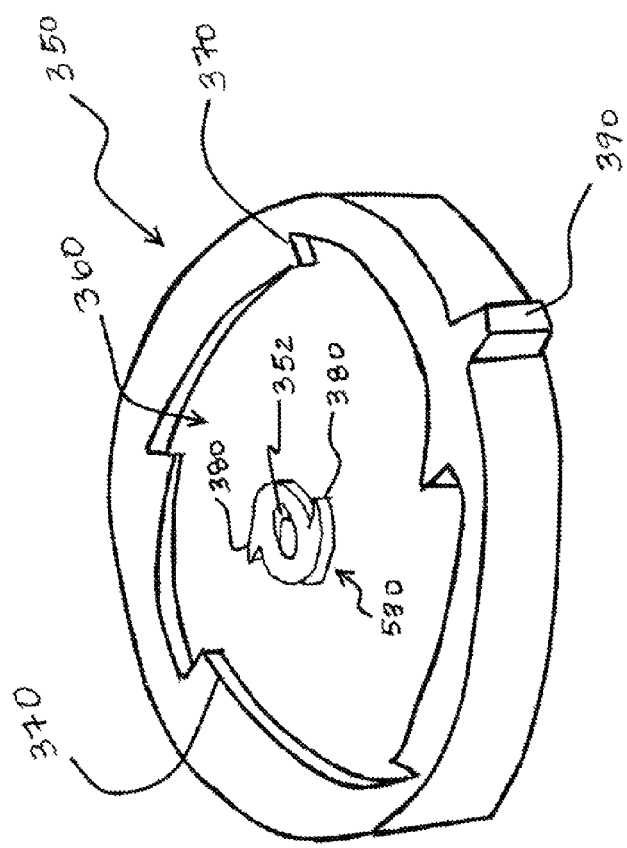
FIG. 8 is a perspective view of the front side of one embodiment of the spool insert.

FIG. 7 illustrates the stop mechanism side 310 of the tether spool. In one embodiment, the stop mechanism side of the tether spool is twice recessed to receive a torsion spring 420 (FIG. 10), and to receive a spool insert 350 (FIG. 8). The recessed regions 320, 330 are concentric about the spool passageway 340 through which the tether spool support shaft 210 passes. The stop mechanism side of the tether spool further comprises a stop ledge 341 on the inner surface of the recessed region 330. The lower recessed region 320 receives the torsion spring, while the upper recessed region 330 receives the spool insert 350.

The rim of the spool on the stop mechanism side 310 of the tether spool further comprises magnets 335 which work in conjunction with a tether payout sensor 457 (FIG. 14) which is connected to the stator plate, to sense the direction of rotation of the tether spool. The sensor is able to sense the direction of rotation due to using a dual reader set up. Other methods of sensing rotational direction of the spool, such as using a rational direction sensor such as the one used to determine the angular position of the yoke, can also be used. Alternatively, photo sensors, micro switches and other suitable mechanisms for sensing the rotational direction of the tether spool can also be used.

FIG. 8 illustrates one embodiment of a spool insert 350. The spool insert 350 is a disk shaped insert with a ratcheted surface 360 within the plane of the disk. The ratcheted surface 360 comprises a set of outer ratchet teeth 370 and a set of inner ratchet teeth 380 each disposed concentrically about the spool passageway 352 of the spool insert 350. The inner set of ratchet teeth 380 is a part of a home position lock mechanism 530.

The purpose of the home position lock 530 mechanism is to prevent the tether from retracting when the tether is at the home position. This is to ensure that the distal end of the tether is available at the home position for attaching the pet at the home position. Activating the home position lock mechanism prevents the distal end of the tether from recoiling back onto the tether spool such that the user has to walk to the tether device to retrieve the distal end of the tether. The spool insert 350 further comprises a stop ledge 390 disposed on the outer surface of the spool insert 350.

In another embodiment, if the user desires to detach the pet from the tether at any position other than the home position, the tether device can be set to lock so that the user will not need to walk over to the tether device to retrieve the retracted tether when the pet is disengaged from the tether device. The tether device can be set to lock via a remote control, or via giving the tether a quick tug, or by some other way to lock the tether in place so that it does not retract. A separate pawl in engagement with the inner set of ratchet teeth can be used to lock the tether spool to prevent the tether from retracting.

Figure 9:
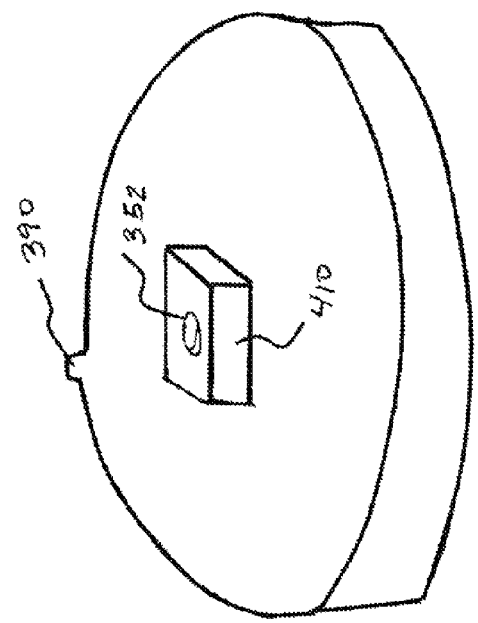
FIG. 9 is a perspective view of the back side of one embodiment of the spool insert.
Figure 10:
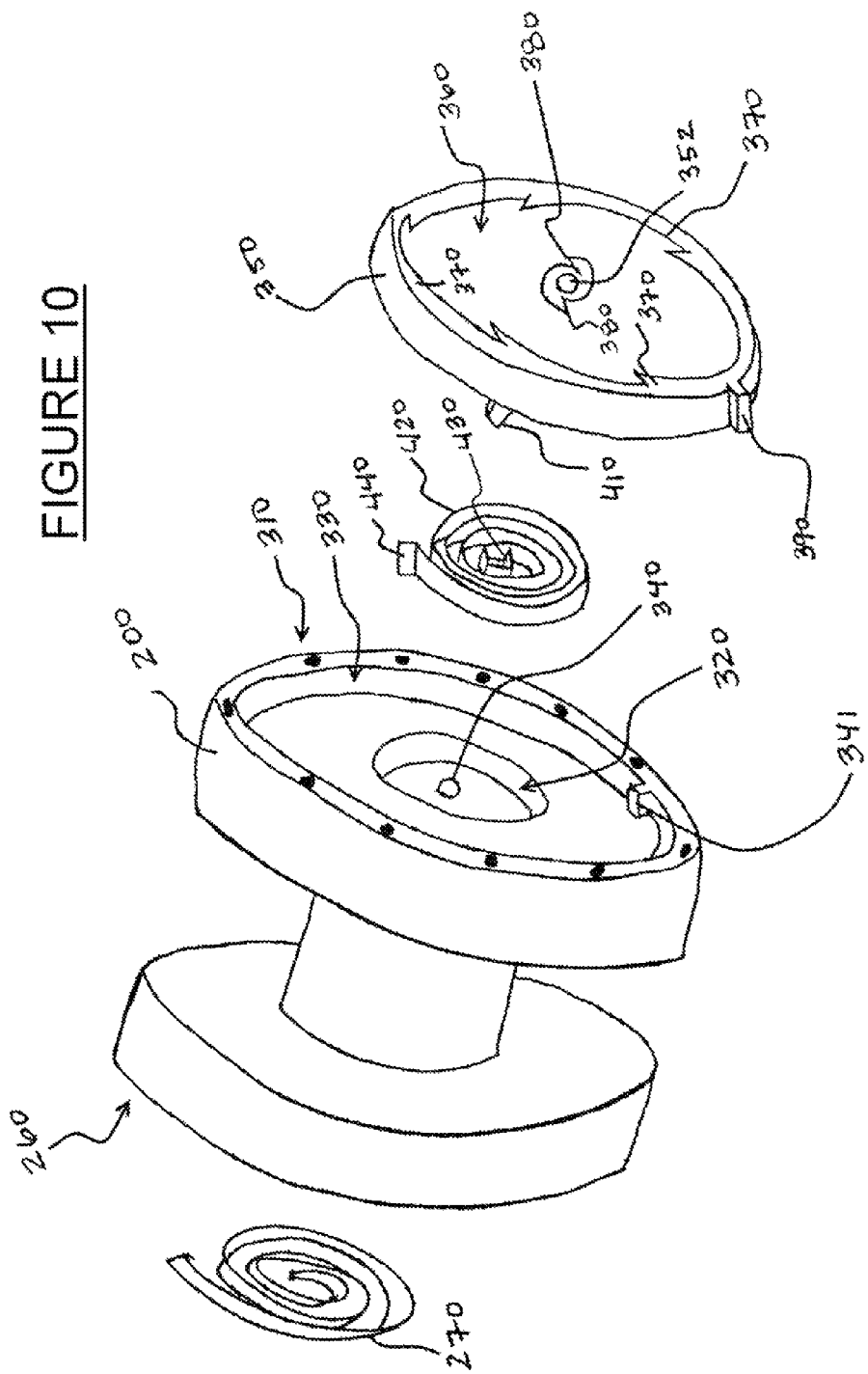
FIG. 10 is an exploded view of the components of the tether device.

On the side opposite to the ratcheted surface 360 of the spool insert is a torsion spring engagement mechanism 410. In the embodiment illustrated in FIG. 9, the mechanism 410 is a rectangular protrusion which mechanically engages with the rectangular central portion 430 of the torsion spring 420 (FIG. 10). Other suitable mechanisms for connecting the spool insert to the torsion spring 420 known to one skilled in the art can also be used.

Figure 11:
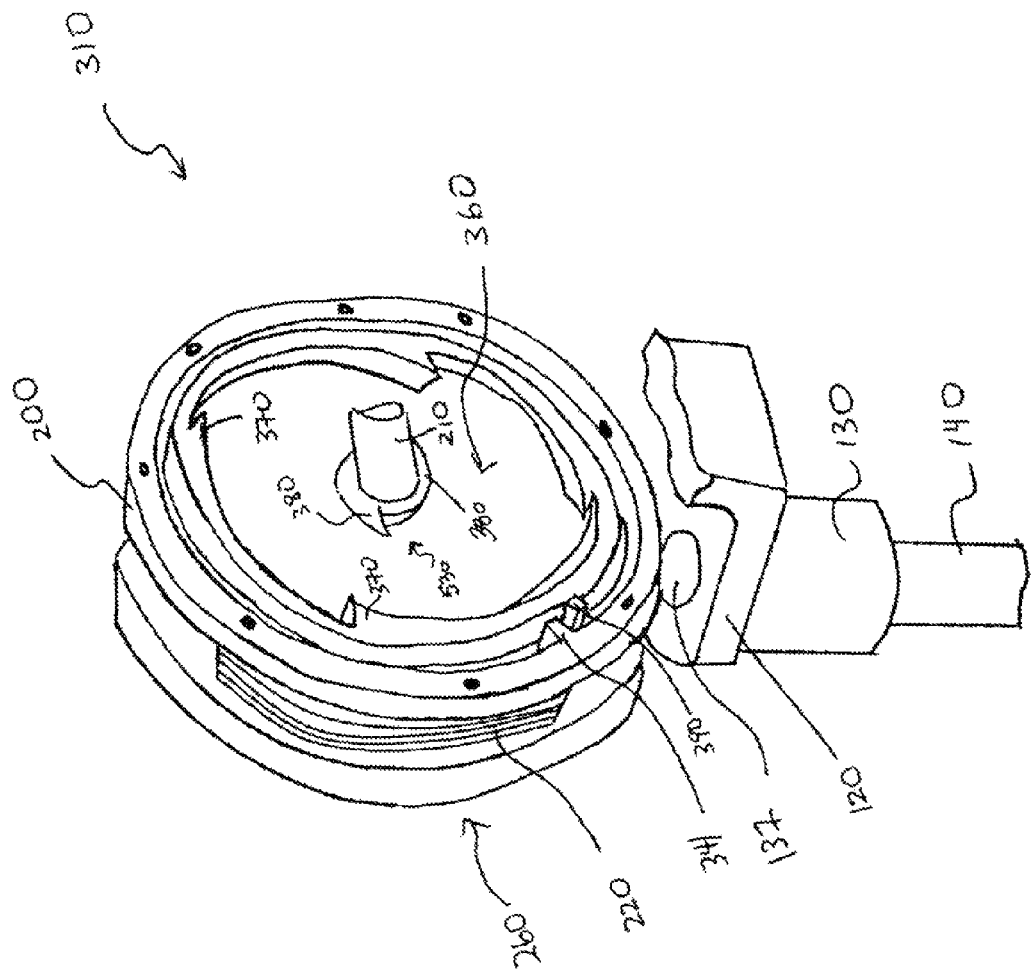
FIG. 11 is a perspective view of the spool stop mechanism side with the insert assembled.

FIG. 10 is an exploded view of the components in contact with tether spool 200. The retraction spring 270, is to be nested within the retraction side 260 of the tether spool, and is in connection with the rim of the spool, as well as the spool shaft (not shown). On the opposite side of the retraction side of the spool is the stop mechanism side 310 of the tether spool. A torsion spring 420 is nested within the recessed region 320 of the stop mechanism side of the tether spool. One end 440 of the torsion spring 420 is connected to the recessed region 320 rim of the tether spool and the opposite end of the torsion spring forms a mechanical engagement for receiving the back end of the spool insert at the central portion 430 of the torsion spring. The spool insert 350 is disposed over the torsion spring 420, and faces the stator plate (not show). FIG. 11 shows the components of FIG. 10 in its assembled state. A cutaway view of the stator plate is provided to allow for clarity.

Because the distal end of the torsion spring 440 is connected to the recessed region 320 rim of the tether spool, and the central portion 430 of the torsion spring is connected to the insert spool rectangular protrusion 410, the insert is connected to the tether spool by virtue of its connection to the torsion spring.

The stop mechanism side 310 of the tether spool comprises a primary stop mechanism, a secondary stop mechanism, and a tertiary stop mechanism. The primary stop mechanism is based on the ratcheting mechanism 370 on the ratcheted surface 360 of the spool insert 350. The tether spool rotates along the spool support shaft in an orientation such that the stop mechanism side 310 of the tether spool faces the stator plate 150. When the tether device senses that a pet is nearing the permissible perimeter, a microcontroller sends a signal to activate a solenoid disposed on the surface of the stator plate facing the tether housing, to move the pawl into place. Once in place, the pawl engages with the ratchet such that the tether spool can only move in the direction of retraction of the tether.

Figure 12:
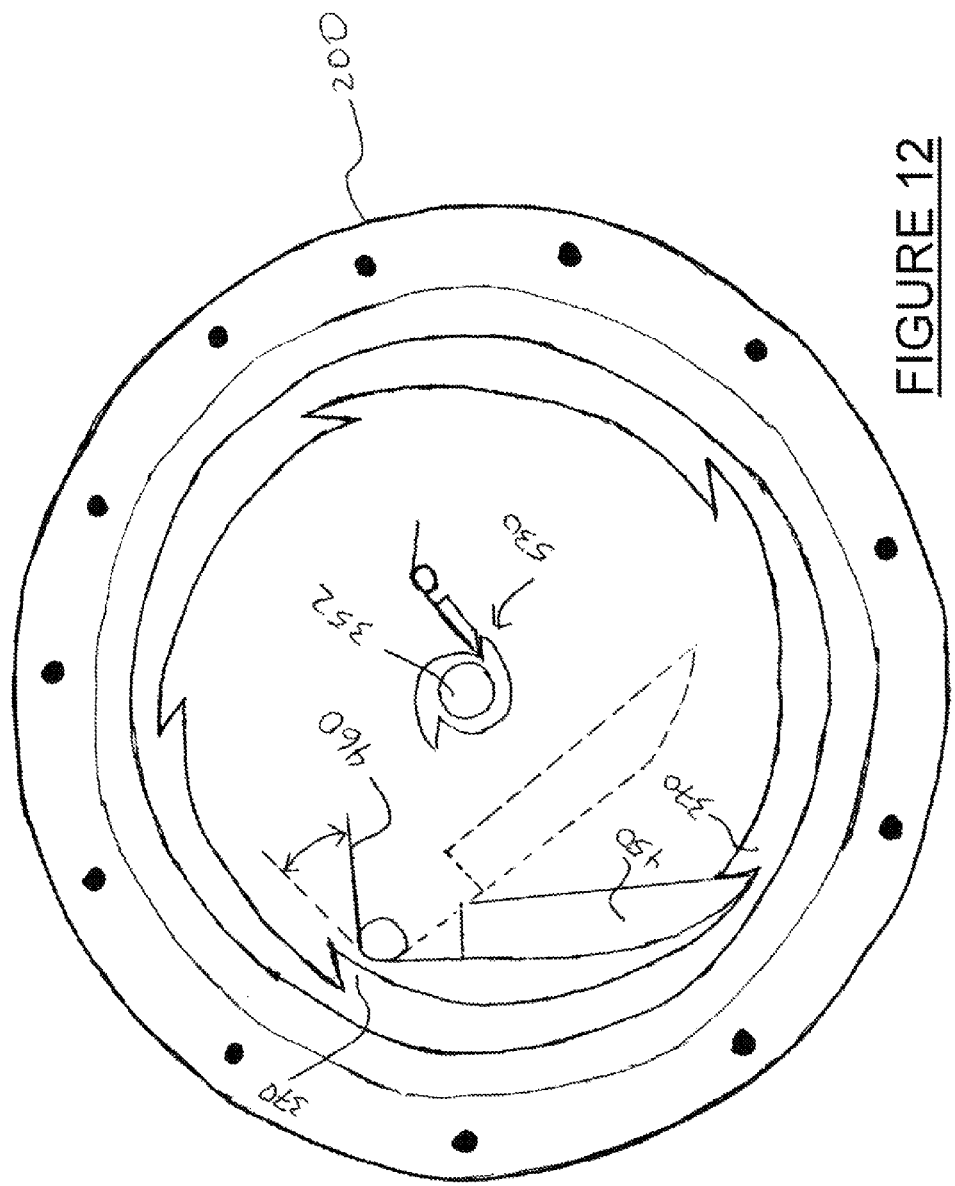
FIG. 12 illustrates one exemplary embodiment of a primary stop mechanism.
Figure 13:
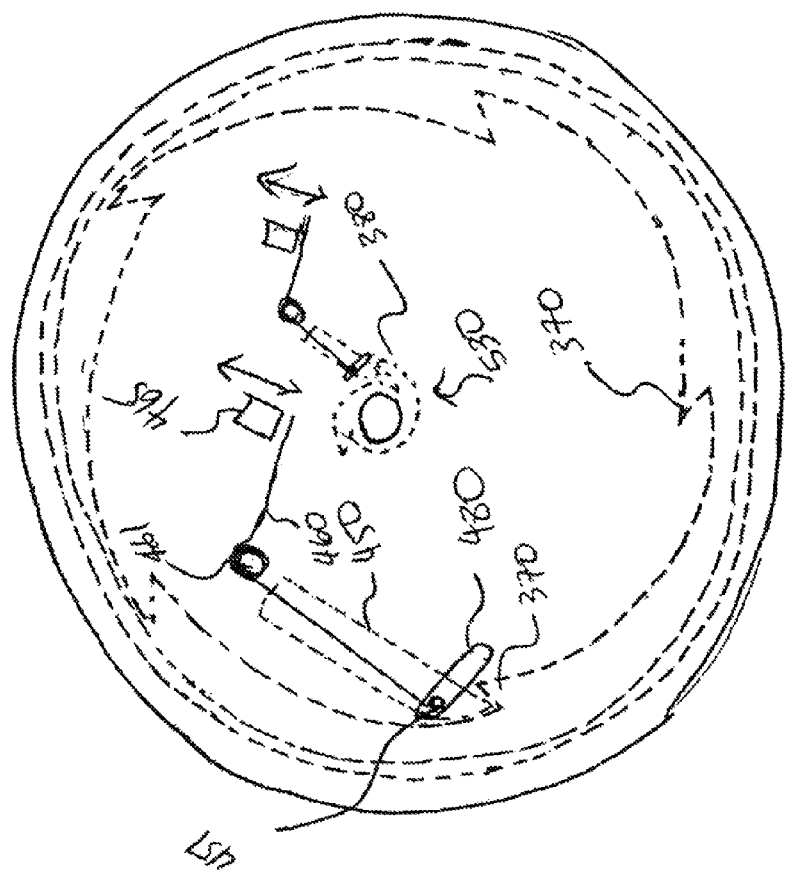
FIG. 13 illustrates the view from the housing side of the stator plate.

In the embodiment illustrated in FIG. 12, the primary stop mechanism comprises the outer set of ratchet teeth 370, a pawl 450 which engages with the ratchet teeth to stop the rotation of the spool insert in one direction; a torsion spring arm 460 connected to the pawl 450 to effectuate movement of the pawl, and a push solenoid 470 (not shown) which applies and releases pressure on the spring arm 460 in the direction denoted by the double headed arrow, to move the pawl into position. The pawl 450, spring arm 460, and push solenoid 470 are mounted onto the stator plate 150, with the pawl mounted to the side of the stator plate 150 that is facing the ratchet surface. The spring arm and solenoid are on the opposite side of the stator plate which faces the housing. For the purposes of ease of description, the stator plate is not shown in FIG. 12. The spring arm 460 is connected to the pawl through an opening 480 in the stator plate, as illustrated in FIG. 13. FIG. 13 illustrates the view of the stator plate as viewed from the housing side of the stator plate towards the tether spool. Dashed lines indicate objects behind the stator plate. The pawl 450 is connected to the spring arm via a pin 451 which extends from the pawl and through the opening 480. The spring arm 460 is a torsion spring which is wrapped around a pivot pin 461 in reaction to the push and return movement of a solenoid 465 which releases the force exerted on the pivot pin 461. A similar mechanism is used for the home position locking mechanism 530. Any other suitable mechanism for moving the pawl into a position of engagement and disengagement from the ratchet teeth can be used. For example, pneumatic activators, linear activators, servo motors with cam actions, can also be used.

Figure 14:
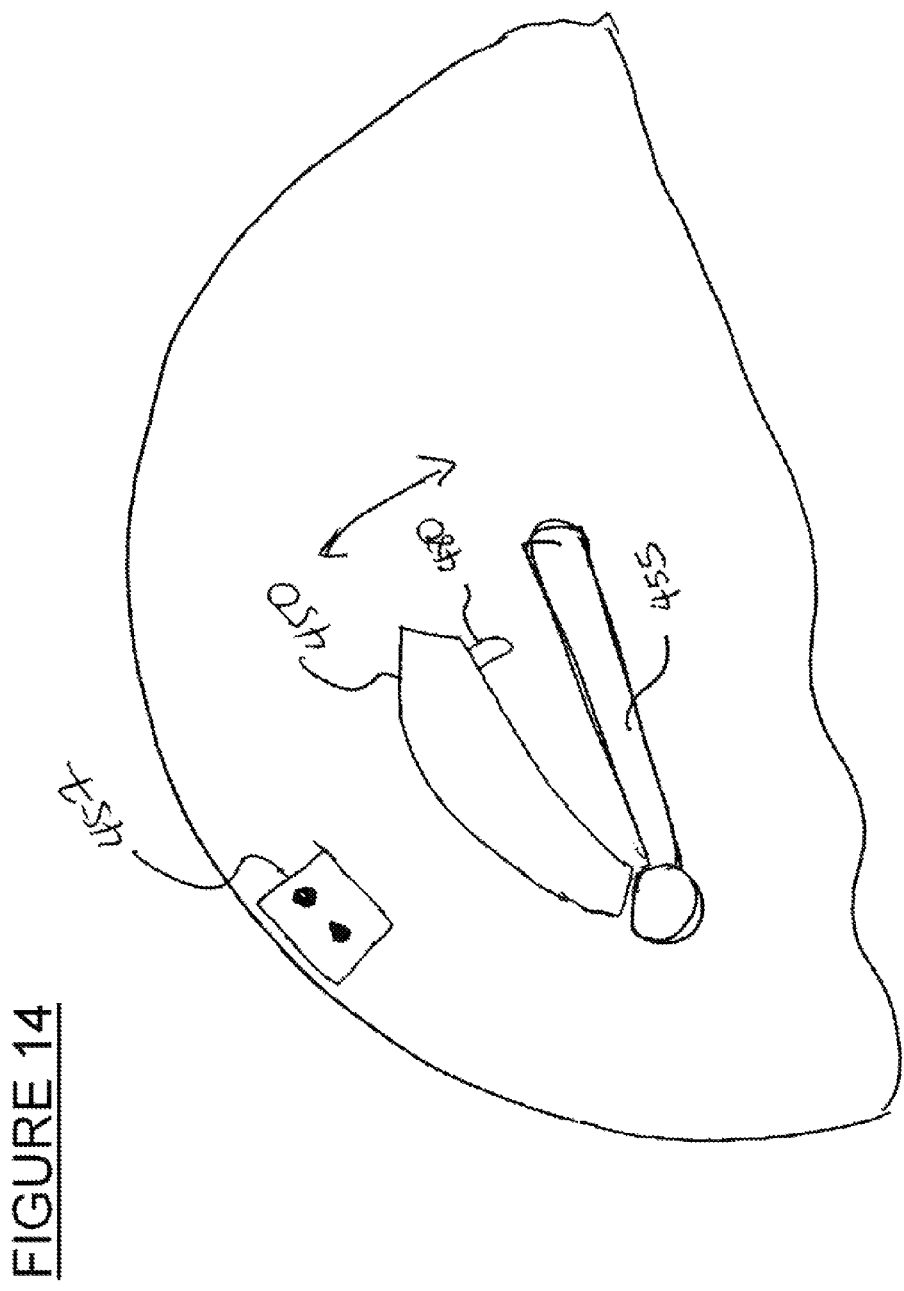
FIG. 14 illustrates the spool side of the stator plate.

FIG. 14 illustrates the side of the stator plate that faces the tether spool. The pawl 450 is capable of movement in the directions indicated by the double headed arrow. The movement in both directions can be restricted by the length of the opening 480 in the stator plate, or alternatively, as in the embodiment shown, the movement in one direction, typically when the solenoid releases contact of the spring arm, can be restricted by using a stop 455 to prevent the pawl from rotating too far away from a useful standby position. A similar set up is used for the home position locking mechanism.

The pawl 450 is connected to the spring 460 which in its natural state is one of disengagement of the pawl from the ratchet teeth. When the tether device senses that a pet is nearing the permissible perimeter, the solenoid 465 (FIG. 13) is activated to press on the spring, causing the pawl to engage with the ratcheting teeth, thus activating the primary stop mechanism. When the pawl is activated to engage with the ratcheting teeth, the spool insert is only able to rotate in a direction of retraction of the tether. Once the pet has sufficiently retracted, the solenoid returns the spring arm 460 to its position of disengaging the pawl from the ratchet mechanism. The primary stop mechanism can also be programmed to be activated when the pet is moving at a high speed, as indicated by the rate of tether payout, or by any other triggering circumstances where it would be desirable for the primary lock mechanism to be activated.

The secondary stop mechanism is provided by the tension spring 420 which kicks into play after the primary stop mechanism has been activated. The tether spool, by virtue of being connected to the spool insert, is also only able to rotate in a direction of retraction of the tether after the secondary stop mechanism has been activated. Once the primary stop mechanism has been activated, rotation of the tether spool in a payout direction is limited. The secondary stop mechanism is the torsion spring which provides a cushioning mechanism to prevent the sudden jerking of the pet to a stop by providing a cushioning payout length of tether once the primary stop mechanism has been activated.

Once the primary stop mechanism has been activated, yet the pet insists on moving beyond the permissible perimeter, the secondary stop mechanism provides increasing resistance as a result of the torsion spring, as the pet moves forward. At this point, the pet may not be able to exert enough force to overcome the resistance of the torsion spring, and is finally forced to stop. Alternatively, if the pet is strong enough to exert enough force to overcome the resistance in the tension spring, the tertiary stop mechanism provides an absolute stop to ensure that the tether spool can no longer rotate in a tether payout direction.

The tertiary stop mechanism is one wherein the stop ledge 341 of the tether spool and the stop ledge of the tether insert 390 abut. The tertiary stop mechanism is activated when the resistance in the torsion spring is insufficient to keep the tether spool from rotating more than 360 degrees after the primary stop mechanism has been activated. When the stop ledges abuts each other, the occurrence prevents the tether spool and the spool insert from further rotating relative to each other. During activation of the secondary stop mechanism, the tether spool and spool insert is able to rotate relative to each other, but under the resistance from the torsion spring. Once the tertiary stop mechanism has stopped, the tether spool and spool insert are locked together in engagement, and the tether spool is prevented from any further pay out due to being stopped by the spool insert, which itself has been stopped from rotating in a payout direction by the pawl, thus ensuring a final stop to the payout of the tether.

The two stop ledges do not engage with each other during normal operation of the tether spool, and is only activated when the pet exerts a force sufficient to overcome the resistance of the torsion spring secondary stop mechanism. In its inactivated state, the two stop ledges are oriented adjacent to each other such that when the secondary stop mechanism is activated, the tether spool is allowed to rotate up until the stop ledges abut. The tertiary stop mechanism stops the rotation of the tether spool and the spool insert relative to each other. Other stop mechanisms, known to one skilled in the art, for effectuating a stop to the rotation of the tether spool and spool insert relative to each other can also be used.

Preferably, the cushioning resistance in the torsion spring is suitably selected for appropriate pet size such that the pet may be stopped with a cushioning payout length not exceeding the length equivalent to one rotation of the tether spool. The appropriate resistance in the torsion spring depends on the size of the pet and the radius of the tether spool. The cushioning resistance of the secondary stop mechanism can also be provided by a compressible material, such as rubber, to provide a cushioning resistance. Other suitable materials, and other suitable ways for providing a cushioning resistance can also be used.

Figure 15:
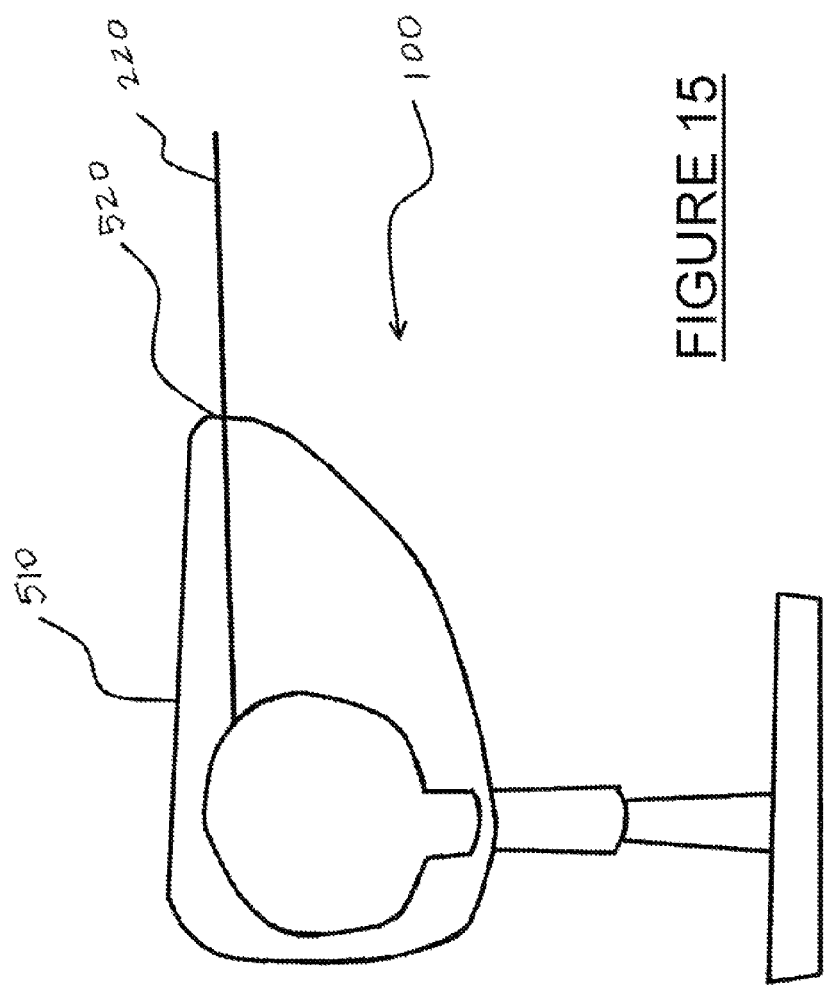
FIG. 15 is a side view of the tether device enclosed within a housing.

FIG. 15 illustrates one embodiment of the housing 510 for the tether device. The housing encompasses the tether device, and has an outlet 520 for the tether 220 to extend from the housing 510. The tether outlet 520 is preferably located a suitable distance away from the vertical axis of the yoke to aid in providing better directional accuracy.

Figure 16:
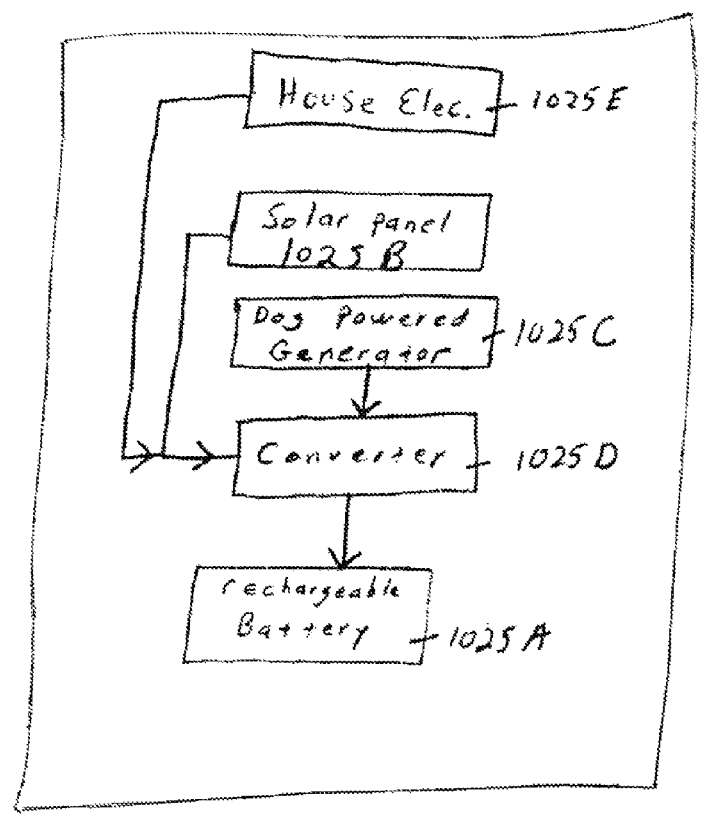
FIG. 16 is a schematic diagram of one embodiment of a power supply system that may be used in the pet tether device of an exemplary embodiment of the invention.

Power supply for the tether device can be any suitable power supply, such as a battery, or a rechargeable battery, or direct connection to an outlet. Preferably the power supply is in the form of a rechargeable battery, such as a lithium ion rechargeable battery, a rechargeable battery 1025A with a solar charging source 1025B, or other suitable battery types. As illustrated in FIG. 16, the rechargeable battery may be charged by one or more of the following sources—power from an electric outlet 1025E, a solar panel 1025B, or a generator 1025C powered by the force of the tether being paid out as the pet pulls on the tether spool supply. Power supply is transported to a converter 1025D which recharges the rechargeable battery. The solar charging source can be disposed on the top surface of the housing to maximize its exposure to sunlight, while connected to a rechargeable battery 1025A within the housing 510. In another embodiment, both the rechargeable battery and solar charging source is on the exterior of the housing 510. In other embodiments, more than one solar charging source can be used.

In one embodiment, an alarm scheme is provided with the tether device. The alarm scheme can provide a training element to the tether device, or may just serve to alert the user when alert events are triggered. The tether device can provide three different alarm tones. A level one alarm tone is used to train the pet. Thus, when the pet approaches the perimeter, an alarm tone is generated to condition the pet to recognize that when the sound is heard, they are about to be restricted from going further. A level two alarm is sounded to alert the user to check on the pet's status, such as when there is frequent engagement and disengagement of the tether stop mechanism, or if the pet is outside the desired area for an extended period of time, or if the pet is standing at the home position for an extended period of time indicating it wants to be removed from the device. A level three warning tone is used to indicate to the user the need to immediately check on the pet for various reasons, including, for example, if there is potential that the pet may have escaped. The user can be alerted of any of the three levels of alarm by a remote alarm that is placed inside the house and in communication with the controller. Preferably only level 2 and 3 alarms are communicated to the user, as the level 1 tone is used to train the dog. The duration of each alarm, and various other permutations of using the alarm to indicate various circumstances of the dog's location, can be used.

Figure 17:
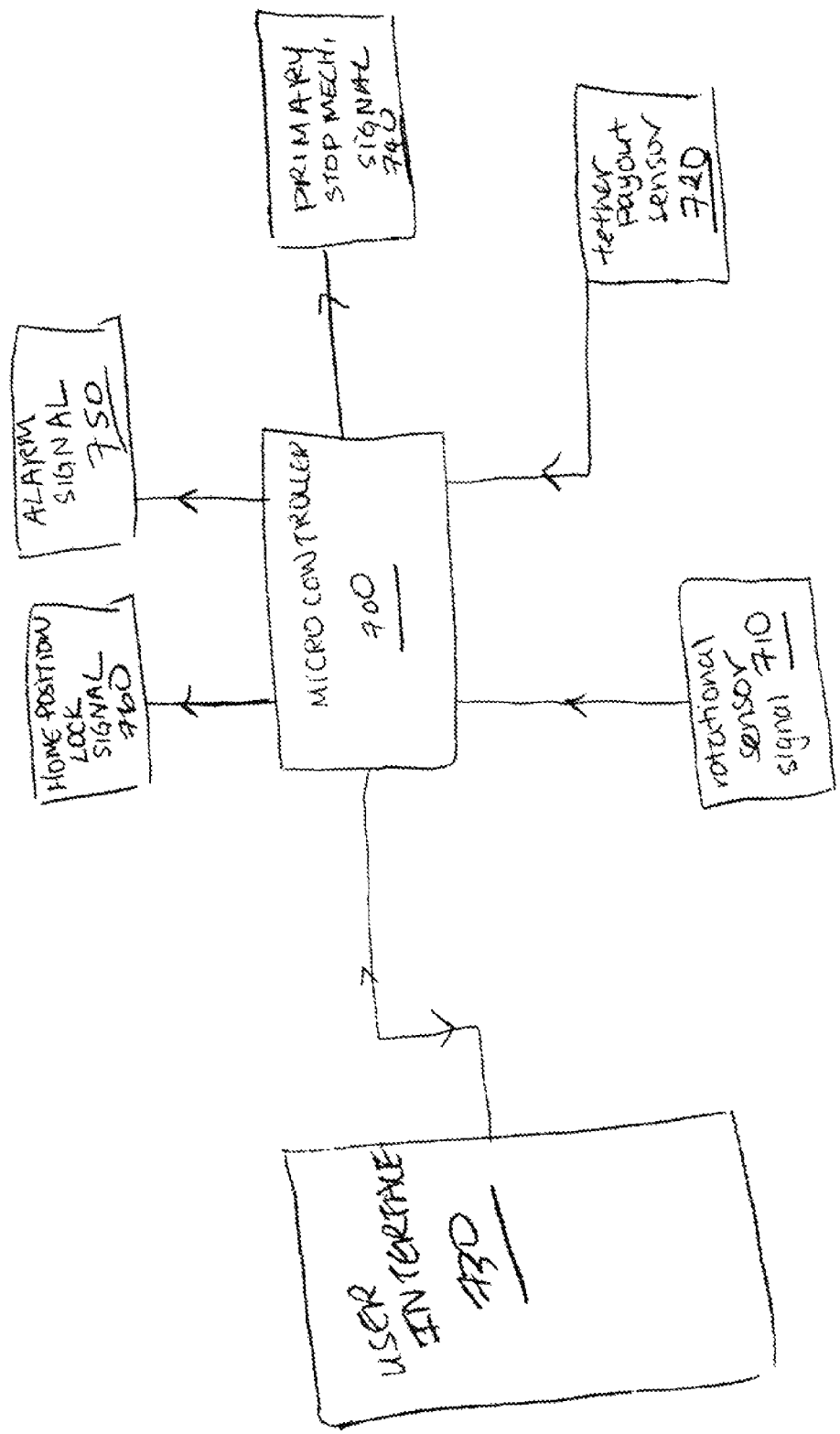
FIG. 17 is a schematic diagram of one embodiment of a control system that may be used in the pet tether device of an exemplary embodiment of the invention.

FIG. 17 is a schematic diagram of one embodiment of a control system that may be used with the pet tether device. To use the device, the user sets the microcontroller to "program mode" using a user interface 730. Once the microcontroller is in program mode, the user holds distal end 300 of the tether, walks to the home position H and waits for a signal that indicates home position has been accepted into the microcontroller. Once the coordinates for the home position have been acknowledged, the user walks within the yard to identify an outer perimeter 400 defining an area within which the pet is allowed to roam. The user can program the tether device to avoid areas such as an outdoor dining area 610, shrubbery 620, or a pool area 630. In another embodiment, the user may begin by starting at a start position which need not necessarily correspond to the home position. The home position may be programmed at a separate time from defining the area within which the pet is allowed to roam to allow for changes to the location of the home position without having to require the user to sweep out the permissible perimeter each time the user desires to change the location of the home position.

Upon defining the outer perimeter 400, the microcontroller 700, through the signals 710 from the rotational sensor 137 and the signals 720 from tether pay out sensor 457, will automatically detect that programming is complete when the distal end of the tether is back to the home position. In an alternative embodiment, the user uses the interface to exit program mode, rather than automatically exiting the program mode when the distal end of the tether is in the home position. This is to account for circumstances where the user desires that the home position be at a different distance, but not angle, than longest tether payout allowed for that particular directional angle.

In another embodiment, the microcontroller can be set to exit program mode after a pre-determined amount of time has lapsed without additional rotational movement. Alternatively, a second user stationed by the tether device can be responsible for activating and deactivating the microcontroller 700 from its program mode. In another embodiment, the microcontroller can be set to begin in program mode after a period of delay to allow the user time to reach point A after activating the programming mode on the user interface attached to the tether device. In another embodiment, the microcontroller can be operated remotely such that a person standing at point A on the perimeter can remotely activate the program mode. In yet another embodiment, the microcontroller can be set to begin program mode once the program mode has been activated, and the user, once reaching a position along the perimeter, uses the tether to activate the program mode. The tether can be used to activate the program mode by giving it a quick tug in at least one direction.

The microcontroller records the outer perimeter 400 based on a series of coordinates that define the outer perimeter 400. If the user begins programming the microcontroller at point A (FIG. 1), the rotational sensor will note the starting position of the distal end of the tether for purposes of using the starting position as a reference from which to measure angles of rotation of the distal end of the tether. The tether 220 is extended a distance "a" to reach point A, the starting point, on the perimeter. A tether payout sensor notes that the tether has been dispensed for a distance "a". The tether payout sensor 457 and rotational sensor sends a tether sensor signal 720 and a directional sensor signal 710 to the microcontroller 700 to note that point A on the perimeter is a distance "a" away from the tether device 100. As the user walks around the yard to program the perimeter 400, the microcontroller continuously receives information from the tether sensor and rotational sensor to generate coordinates that define the perimeter. For example, point B on the perimeter will be at X degrees clockwise from point A and a distance "b" from the tether device, while point C will be recorded as being Y degrees clockwise from point A and a distance "c" from the tether device.

Once the outer perimeter has been programmed, the tether sensor and the rotational sensor work in conjunction to determine the position of the pet by providing the positional parameters for polar coordinates, indicating the distance of the pet from the tether device, and the angular distance the pet has traveled from a reference point. Alternatively, positional parameters may be obtained for a Cartesian coordinate system for indicating the position of the pet.

If the pet is at the home position, the microcontroller will send a signal 760 to activate the home lock mechanism. The activation of the home position lock mechanism can be activated after the distal end of the tether has been at the home position for a predefined duration of time, such as for example, a few seconds, in order to not confuse the random wandering of the pet into the home position, with the desire that the pet be detached at the home position. Alternatively, in one embodiment, the home position lock mechanism can be set to activate by a quick tug, or a series of tugs, on the distal end of the tether, when the distal end of the tether is in the home position.

Once a pet has reached the pre-determined allowable distance for a particular angular direction, the microcontroller 700 sends a signal 740 to the locking mechanism to activate the primary stop mechanism to prevent further rotation of the spool insert in the dispensing direction. Any attempts by the pet to extend the tether beyond the pre-defined perimeter can also be set to cause a training alarm to go off. The micro controller 700 will send a signal 750 to trigger an alarm tone. The pet is prevented from going any further in that particular direction, but is able to move towards the pet tethering device, on to a different location with a different allowed distance, or in other directions which may shorten the tether, for example such as in a situation where the tether has wrapped around an intervening obstacle. Thus, in the course of wandering around the yard, the pet is gradually removed or discouraged from entering the off-limits area by preventing the tether from being further dispensed while only allowing the tether reel to rotate in a retraction direction, thus effectuating a "passive retreat mechanism."

Although the tether device will prevent a pet from directly entering an off-limits area, it is possible the pet may enter restricted areas indirectly, such as when the tether is wrapped around an intervening obstacle, for example a patio chair leg which keeps the leash at a set angular distance as sensed by the rotational sensor, yet allowing the pet to move in additional directions with the remainder of the tether beyond the intervening obstacle, or such as when the pet obtains a long tether by traveling in one direction, and maintaining the long tether while wandering into an off-limits area. If a pet moves towards the pet tethering device, or otherwise in a direction allowing retraction of the tether, the locking mechanism allowing only retraction is released once the pet has moved back within the permissible area. Alternatively, the locking mechanism allowing only retraction can be set to release once the pet has moved a pre-set distance closer to the tethering device, or has otherwise allowed a pre-set amount of tether to be retracted. This pre-set distance can be set further back from the perimeter than a distance just within the perimeter, to prevent the pet from wandering, shortly after the locking mechanism is released, back again towards the off-limits area.

When the microcontroller determines that the primary stop mechanism should be activated, for example when the pet nears the perimeter 400 (FIG. 1), the microcontroller 700 sends a signal to activate the solenoid such that it pushes the spring lever arm, which moves the pawl into position to engage with the ratchet teeth 370 on the spool insert, which prevents the tether from being further dispensed, while allowing retraction. Once the microcontroller determines that the locking mechanism to prevent dispensing rotation is no longer needed, for example when the pet has sufficiently stepped back from the off limits perimeter 400, the microcontroller sends a signal to allow the solenoid to retreat, and accordingly allow the spring arm and the pawl, to move back to a position where it does not engage with the ratchet teeth 370. The microcontroller is also in signal communication to activate indicator lights, such as low battery LEDs, or other indicator lights on the user interface, as well as activate any tones for an alarm. In one embodiment, where a remote alarm center is used, the microcontroller is responsible for communication with the remote alarm center.

From the foregoing, it will be observed that numerous variations and modifications may be effected without departing from the spirit and scope of the invention. It is to be understood that no limitation with respect to the specific apparatus illustrated herein is intended or should be inferred.

All references, including publications, patent applications, and patents, cited herein are hereby incorporated by reference to the same extent as if each reference were individually and specifically indicated to be incorporated by reference and were set forth in its entirety herein.

The invention claimed is:

1. A method of tethering a pet to a tether device which allows the pet to freely roam within a pre-defined area of space while restricting movement of the pet beyond the pre-defined area of space by activating a locking mechanism, comprising the steps of:
   programming the tether device to recognize the perimeter of the pre-defined area of space;
   providing information on the location of the pet to a microcontroller;
   comparing the information on the location of the pet to determine the pet's proximity to the perimeter of the pre-defined area of space;
   dispensing the tether as needed so long as the pet is within the pre-defined area of space;
   retracting the tether as needed to prevent slack in the tether; and
   activating at least one locking mechanism to prevent a pet from exceeding the perimeter of the pre-defined area of space.

2. The method of claim 1 wherein the step of programming the tether device comprises:
   using a distal end of the tether to sweep out an area of space corresponding to the pre-defined area of space.

3. The method of claim 1 wherein the step of providing information on the location of the pet comprises the steps of:
   using a payout sensor to sense the amount of tether paid out;
   transmitting information on the amount of tether paid out to the microcontroller;
   using a directional sensor to sense the rotational direction of a distal end of the tether; and
   transmitting information on the rotational direction of the distal end of the tether to the microcontroller.

4. The method of claim 1 wherein the step of activating at least one locking mechanism comprises the step of:
   engaging a pawl with a ratchet mechanism.

5. The method of claim 4 wherein the step of engaging a pawl with a ratchet mechanism comprises the step of
   triggering movement of a solenoid to push a spring arm connected to the pawl to move the pawl in engagement with the ratchet mechanism.

6. The method of claim 1 wherein the step of retracting tether as needed to prevent slack comprises the step of:
   providing a force on the tether device which reels in tether into the tether device as the pet moves towards the tether device.

7. The method of claim 1 further comprising the steps of:
   activating a secondary locking mechanism to provide a cushioning effect to prevent suddenly stopping the dispensing of tether; and
   activating a tertiary locking mechanism to provide an absolute stop to tether payout.

* * * * *